(12) United States Patent
Yokoyama et al.

(10) Patent No.: US 8,592,067 B2
(45) Date of Patent: Nov. 26, 2013

(54) BATTERY PACK HAVING A HEAT INSULATING LAYER

(75) Inventors: Tomohiko Yokoyama, Osaka (JP); Keisuke Shimizu, Osaka (JP); Masato Fujikawa, Osaka (JP)

(73) Assignee: Panasonic Corporation, Osaka (JP)

( * ) Notice: Subject to any disclaimer, the term of this patent is extended or adjusted under 35 U.S.C. 154(b) by 280 days.

(21) Appl. No.: 13/122,903

(22) PCT Filed: Jun. 7, 2010

(86) PCT No.: PCT/JP2010/003789
§ 371 (c)(1),
(2), (4) Date: Apr. 6, 2011

(87) PCT Pub. No.: WO2010/143408
PCT Pub. Date: Dec. 16, 2010

(65) Prior Publication Data
US 2011/0195291 A1   Aug. 11, 2011

(30) Foreign Application Priority Data
Jun. 8, 2009   (JP) .................................. 2009-137244

(51) Int. Cl.
*H01M 2/10*   (2006.01)
(52) U.S. Cl.
USPC .......................................................... 429/99
(58) Field of Classification Search
USPC .......................................................... 429/99
See application file for complete search history.

(56) References Cited

U.S. PATENT DOCUMENTS

| | | |
|---|---|---|
| 6,521,834 B1 | 2/2003 | Dykhoff et al. |
| 2008/0220320 A1 | 9/2008 | Horikoshi et al. |
| 2009/0308001 A1* | 12/2009 | Wu et al. .................. 52/173.3 |
| 2010/0183910 A1 | 7/2010 | Nishino et al. |

FOREIGN PATENT DOCUMENTS

| | | | |
|---|---|---|---|
| CN | 1449593 | | 10/2003 |
| CN | 201165388 | | 12/2008 |
| GB | 2046502 A | * | 11/1980 |
| JP | 04-162347 | | 6/1992 |
| JP | 08-026812 | | 1/1996 |
| JP | 2003-331803 | | 11/2003 |
| JP | 2005-317455 | | 11/2005 |
| JP | 2008-218210 | | 9/2008 |
| JP | 2009-021223 | | 1/2009 |
| JP | 2009021223 A | * | 1/2009 |
| WO | WO 2010/026731 A1 | | 3/2010 |
| WO | WO 2010/032487 A1 | | 3/2010 |

OTHER PUBLICATIONS

Chinese Office Action issued in the corresponding Chinese Patent Application No. 201080003017.2 mailed Mar. 28, 2013.

* cited by examiner

*Primary Examiner* — Karie O'Neill Apicella
(74) *Attorney, Agent, or Firm* — McDermott Will & Emery LLP

(57) ABSTRACT

A battery pack includes: a plurality of secondary batteries; a housing for containing the secondary batteries; and at least one heat insulating layer for separating the secondary batteries from one another. The at least one heat insulating layer includes a foam material capable of foaming at a first predetermined temperature of 110° C. or more and less than 200° C. When the foam material foams, gas bubbles are produced in the heat insulating layer, so that the thickness of the heat insulating layer increases. The battery pack thus has excellent safety, exhibiting a high heat insulation effect in the event of abnormal heat generation of the batteries.

13 Claims, 2 Drawing Sheets

BATTERY PACK HAVING A HEAT INSULATING LAYER

RELATED APPLICATIONS

This application is the U.S. National Phase under 35 U.S.C. §371 of International Application No. PCT/JP2010/003789, filed on Jun. 7, 2010, which in turn claims the benefit of Japanese Application No. 2009-137244, filed on Jun. 8, 2009, the disclosures of which Applications are incorporated by reference herein.

TECHNICAL FIELD

The invention relates to a battery pack containing a plurality of batteries, and, particularly to an improvement in the structure of a battery pack.

BACKGROUND ART

Recently, portable appliances such as notebook personal computers and cellular phones have become widely used, and there is thus an increasing demand for batteries as the power source for portable appliances. In particular, there is an increasing demand for secondary batteries that are compact and light-weight, have high energy density, and can be repeatedly charged and discharged.

To meet such demand, non-aqueous electrolyte secondary batteries are being actively studied and developed. Since non-aqueous electrolyte secondary batteries contain large energy due to an increase in the functionality of portable appliances, they generate large amounts of heat in the event of abnormal conditions.

Thus, proposals have been made on the structure of a battery pack containing such batteries, in order to suppress, when one of the batteries generates abnormal heat for some reason, the conduction of the heat to adjacent batteries.

PTL 1 proposes separating batteries by a partition plate comprising a flame-retardant resin.

In order to make the partition plate more flame-retardant, PTL 2 proposes using inorganic refractory materials such as mica and ceramics.

CITATION LIST

Patent Literatures

[PTL 1] Japanese Laid-Open Patent Publication No. 2003-331803
[PTL 2] Japanese Laid-Open Patent Publication No. 2008-218210

SUMMARY OF INVENTION

Technical Problem

However, the capacities of batteries contained in battery packs are very high in recent years, and the temperature of batteries in the event of abnormal heat generation may become higher than the temperature conventional partition plates are capable of withstanding. That is, a partition plate comprising a flame-retarded resin material is unable to withstand a temperature increase upon abnormal heat generation, and it is difficult to sufficiently stop the conduction of heat to adjacent batteries.

Also, when a partition plate composed mainly of an inorganic refractory material such as mica or a ceramic is used, the battery pack becomes heavy and very unsuited for portable appliances. Also, since mica and ceramics are expensive materials, the use of a partition plate composed mainly of an inorganic refractory material such as mica or a ceramic makes it difficult to reduce the cost of the battery pack.

Solution to Problem

The invention includes: a plurality of secondary batteries; a housing for containing the secondary batteries; and at least one heat insulating layer for separating the secondary batteries from one another. The at least one heat insulating layer includes a foam material capable of foaming at a first predetermined temperature of 110° C. or more and less than 200° C., and the thickness of the heat insulating layer increases when the foam material foams.

Effects of the Invention

According to the invention, when any one of the batteries contained therein generates abnormal heat, the heat insulating layer is heated, and the foam material contained in the heat insulating layer foams. As a result, the heat insulating layer can exhibit an excellent heat insulation effect. The use of such a heat insulating layer can provide a highly safe, light-weight, and inexpensive battery pack, so that even when any one of the batteries contained therein generates abnormal heat, the conduction of the heat to other batteries can be effectively suppressed.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF EMBODIMENTS

Figure 1:
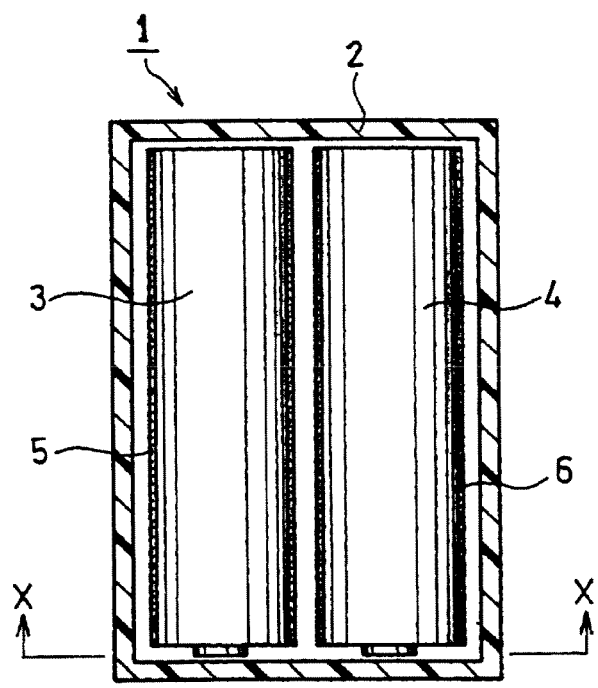
FIG. 1 is a longitudinal sectional view of a battery pack according to Embodiment 1 of the invention.

The invention relates to a battery pack including a plurality of secondary batteries; a housing for containing the secondary batteries; and at least one heat insulating layer for separating the secondary batteries from one another. The heat insulating layer is present at least between adjacent secondary batteries.

The batteries can be, for example, cylindrical or prismatic in shape. A cylindrical battery or a prismatic battery is in the form of a cylinder or a quadrangular prism having a positive terminal at one end face and a negative terminal at the other end face. A plurality of such cylindrical or prismatic batteries are aligned, for example, in a lateral direction, with the side faces of the adjacent batteries facing one another.

The heat insulating layer can be provided as follows. For example, the heat insulating layer can be disposed on the surface (excluding both end faces) of each of a plurality of secondary batteries, or the heat insulating layer can be supported on at least one partition that is disposed so as to separate a plurality of secondary batteries from one another. The partition is preferably a support plate on which the heat insulating layer is supported, or a pouch containing the heat insulating layer. In terms of the heat insulation effect, when cylindrical secondary batteries are aligned in a lateral direction with their axes parallel to one another, the width of the partition is preferably equal to or greater than the diameter of the secondary batteries.

The heat insulating layer includes a foam material capable of foaming at a first predetermined temperature of 110° C. or more and less than 200° C. The first predetermined temperature is the temperature of the heat insulating layer heated when a battery generates abnormal heat. In view of the ambient environment of battery packs and the temperatures of batteries in the event of abnormal heat generation, it is necessary to use a foam material capable of foaming at 110° C. or more. Silicates of alkali metals, which will be described below, foam at temperatures of 110° C. or more and less than 200° C. In order to make the temperature of the heat insulating layer equal to or lower than the temperature of the battery generating heat, the first predetermined temperature is preferably 150° C. or less.

In normal conditions, since the foam material does not foam, the heat insulating layer does not expand, thus being a thin layer. In the event that one of the batteries contained in the battery pack generates abnormal heat, the heat insulating layer in contact with or adjacent to that battery is heated, and the foam material foams. As a result, a large number of gas bubbles are produced in the heat insulating layer, and the thickness of the heat insulating layer increases. The large number of gas bubbles provide good heat insulation, thereby making it possible to effectively suppress the conduction of the heat to adjacent normal batteries.

The heat insulating layer composed mainly of a foam material is generally inexpensive and light-weight and can be easily produced, compared with heat insulating layers composed mainly of inorganic refractory materials such as mica and ceramics. Thus, it enables reduction of weight and cost of the battery pack with a high heat insulation effect.

Also, according to the invention, a foam material is used as the material of the heat insulating layer. Thus, even in the case of using an inorganic refractory material, the use of only a small amount of the inorganic refractory material can provide a sufficient heat insulation effect.

Embodiments of the invention are hereinafter described with reference to drawings. The invention is not to be construed as being limited in any way by the following Embodiments, and can be modified, where appropriate, unless the true spirit and scope of the invention are changed.

Embodiment 1

Figure 2:
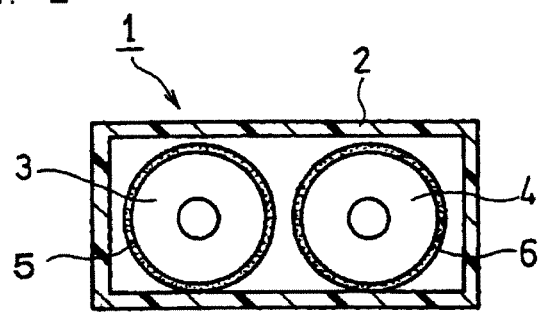
FIG. 2 is a sectional view taken along the line X-X of FIG. 1.

As illustrated in FIG. 1 and FIG. 2, a battery pack 1 of this embodiment includes batteries 3 and 4, which are cylindrical secondary batteries, a prismatic resin housing 2 containing the batteries 3 and 4, and heat insulating layers 5 and 6 covering the side faces of the batteries 3 and 4, respectively. Besides, the battery pack also includes parts (not shown) necessary for the battery pack, such as parts for electrically connecting the batteries 3 and 4 (e.g., leads) and parts for delivering electricity from the battery pack to outside, (e.g., external terminals). These parts may be selected as appropriate from those conventionally used in battery packs Each of the batteries 3 and 4 is a cylinder having a positive terminal at one end face thereof and a negative terminal at the other end face. The batteries 3 and 4 are oriented in the same direction, with their side faces facing each other. The end faces of the batteries 3 and 4 are not covered with the heat insulating layer, so the positive and negative terminals are exposed. Since the end faces of the batteries 3 do not face the end faces of the battery 4, heat conduction is unlikely to occur between the end faces of the battery 3 and the end faces of the battery 4.

The heat insulating layers 5 and 6 mainly contain a silicate of an alkali metal. The alkali metal is preferably at least one selected from the group consisting of sodium (Na), potassium (K), and lithium (Li), since it is inexpensive and convenient for producing a silicate.

In terms of binding strength, Na>K>Li. In terms of water resistance, Li>K>Na. Silicates of these three alkali metals can be used singly or in combination, depending on the device for which the battery pack is used.

Alkali metal silicates contain large amounts of water of crystallization. Alkali metal silicates containing water of crystallization have a composition represented by, for example, the formula: $M_2O.nSiO_2.xH_2O$ wherein M is at least one selected from the group consisting of Na, K, and Li. When M is Na or Li, n is 0.5 to 4. When M is K, n is 0.4 to 4. x is a value representing the amount of water of crystallization, and can be any value depending on the amount of water of crystallization. For example, in the case of sodium metasilicate, M=Na and n=1. In the case of potassium metasilicate, M=K and n=1. In the case of lithium metasilicate, M=Li and n=1.

When an alkali metal silicate containing water of crystallization is exposed to a high temperature, the alkali metal silicate starts to release water of crystallization around approximately 110° C., and at the same time, starts to foam. Thus, a large number of gas bubbles are produced inside the heat insulating layer 5 or 6, and its thickness is increased to provide improved heat insulation.

For example, in the case of abnormal heat generation of the battery 3 in the battery pack 1, when the heat insulating layer 5 is heated to the first predetermined temperature, the alkali metal silicate in the heat insulating layer 5 foams, so the heat insulating layer 5 expands while producing gas bubbles. As a result, the expanded heat insulating layer 5 containing a large number of the gas bubbles suppresses the conduction of heat from the battery 3 to the adjacent battery 4, thereby preventing the abnormal heat production of the battery 3 from affecting the battery 4.

In terms of the space inside the housing and the heat insulation of the insulating layers 5 and 6, the expansion rate of the heat insulating layers 5 and 6 in the thickness direction is preferably 30 to 600%, and more preferably 200 to 400%.

The expansion rate is represented by the following formula.

Expansion rate (%)=(thickness of heat insulating layer after expansion−thickness of heat insulating layer before expansion)/(thickness of heat insulating layer before expansion)×100

The degree of expansion of the heat insulating layer can be adjusted according to, for example, the kind and content of the foam material and the content of a foam promoter which will be described below.

The thickness of the heat insulating layer refers to, in a section of the cylindrical battery perpendicular to the axial direction thereof, the thickness of the heat insulating layer in the direction of the diameter of the cylindrical battery. In the case of a prismatic battery, the thickness of the heat insulating layer refers to the thickness in the direction perpendicular to the side faces of the prismatic battery.

Further, the heat insulating layers 5 and 6 also have the effect of cooling the batteries due to latent heat released when the alkali metal silicate releases water of crystallization. Therefore, an alkali metal silicate is very preferable as a material of the heat insulating layer. When the foam material is an alkali metal silicate, the cooling effect can be obtained in addition to the heat insulation effect obtained by foaming of the foam material, and thus, the conduction of the heat generated by the battery 3 to the battery 4 can be suppressed more effectively.

Also, since the heat insulating layers 5 and 6 are composed mainly of an incombustible material having no ignition point or flash point, they are suitable for enhancing the reliability of the battery pack 1.

In order to provide more effective heat insulation when the heat insulating layer is heated to a temperature higher than the first predetermined temperature at which the alkali metal silicate foams, it is preferable that the heat insulating layers 5 and 6 further contain a foam promoter capable of foaming at a high-temperature environment (a second predetermined temperature of 200° C. or more).

The foam promoter is preferably a material which releases a gas at a temperature higher than the temperature at which the alkali metal silicate foams by releasing water of crystallization which becomes steam. The foam promoter releases a gas when the heat insulating layer is heated to a temperature higher than the first predetermined temperature due to abnormal heat generation of the battery. This increases the amount of gas which is produced in the heat insulating layers 5 and 6 to form a foam. Hence, the thickness of the heat insulating layers 5 and 6 after the foam material has foamed can be increased, compared with that of the heat insulating layer containing no foam promoter. As a result, the heat insulation effect of the heat insulating layers 5 and 6 can be further enhanced.

The foam promoter is preferably at least one selected from the group consisting of aluminum hydroxide, calcium hydroxide, magnesium hydroxide, alum, sodium sulfate, calcium carbonate, magnesium carbonate, and barium carbonate.

A representative combination of a foam material and a foam promoter is a sodium silicate combined with aluminum hydroxide or magnesium hydroxide. When heated to approximately 130 to 150° C., a sodium silicate foams by releasing water of crystallization which becomes steam. Aluminum hydroxide is thermally decomposed when heated to approximately 200 to 300° C., to produce steam. Also, magnesium hydroxide is thermally decomposed when heated to approximately 400° C. or more, to produce steam. With such a combination, when the temperature of the heat insulating layer becomes higher than the temperature at which the sodium silicate releases steam, the foam promoter, namely aluminum hydroxide or magnesium hydroxide, is thermally decomposed to produce steam. Thus, even when the temperature of the heat insulating layer becomes higher than the temperature at which the sodium silicate releases steam, gas bubbles can be continuously produced in the heat insulating layer.

The content Wa of the foam promoter in the heat insulating layers 5 and 6 is preferably 5 to 95 parts by mass, and more preferably 20 to 80 parts by mass, per 100 parts by mass of the alkali metal silicate (excluding water of crystallization. If the content of the foam promoter is too small, the foam promoter may not produce a sufficient effect. If the content of the foam promoter is too large, the content of the foam material decreases relatively, so the heat insulation effect of the heat insulating layers 5 and 6 may become insufficient. Also, in the case of using a structural material which will be described below, the content of the structural material decreases relatively, so the bonding strength between the heat insulating layers 5 and 6 and the batteries 3 and 4 may lower. As a result, the heat insulating layers 5 and 6 tend to partially separate from the surfaces of the batteries 3 and 4.

To improve the morphological stability of the heat insulating layer in a high-temperature environment, it is preferable that the heat insulating layers 5 and 6 further include a structural material comprising inorganic particles that do not foam at a high-temperature environment (second predetermined temperature of 200° C. or more). More preferably, the heat insulating layers 5 and 6 include both a foam promoter and a structural material.

The inorganic particles are uniformly dispersed in the heat insulating layer. The inorganic particles are preferably particles of a ceramic in terms of heat resistance and the morphological stability of the heat insulating layer.

More preferably, the ceramic comprises at least one ceramic selected from the group consisting of aluminum silicate, sodium silicofluoride, bentonite, monmorillonite, kaolinite, mullite, diatomaceous earth, alumina, silica, mica, titanium oxide, vermiculite, pearlite, Maglite, sepiolite, talc, calcium silicate, magnesium silicate, calcium sulfate, and cement.

The shape of the particles is, for example, a sphere, a flake, or a fiber. When the structural material is in the form of a fiber, it preferably has a mean fiber length of 0.1 to 100 μm and a mean fiber diameter of 0.01 to 10 μm. When the structural material is spherical, it preferably has a mean particle diameter of 0.1 to 100 μm. When the structural material is in the form of a flake, it preferably has, for example, a thickness of 0.01 to 10 μm and a maximum size of 0.05 to 100 μm.

The content Wb of the structural material in the heat insulating layers 5 and 6 is preferably 5 to 70 parts by mass, and more preferably 10 to 50 parts by mass, per 100 parts by mass of the alkali metal silicate (excluding water of crystallization).

If the content of the structural material is too small, the thickness of the heat insulating layers 5 and 6 may partially become uneven when the heat insulating layers 5 and 6 foam, and the heat insulation effect of the resultant foam layer (expanded heat insulating layer) may become insufficient. If the content of the structural material is excessive, the contents of the foam material and the foam promoter decrease relatively, so the heat insulation effect of the heat insulating layers 5 and 6 may become insufficient.

In terms of the heat insulation effect and the reduction of size and weight of the battery pack, the thickness of the heat insulating layer (the thickness before the foam material foams) is preferably 0.1 to 3 mm, and more preferably 1 mm or less. Even when the heat insulating layer is as thin as 1 mm or less, the morphological stability of the heat insulating layer can be secured, since the heat insulating layer is held on the battery surface.

The method for producing such a battery pack includes, for example, the steps of:

(A) preparing the housing 2;

(B) preparing a composition containing an alkali metal silicate used to form a heat insulating layer;

(C) applying the heat-insulating-layer forming composition prepared in step (B) to the side face of each of the batteries 3 and 4 to form a layer with a uniform thickness and drying it to form the heat insulating layers 5 and 6; and (D) placing the batteries 3 and 4 into the housing 2.

Step (A) is described below.

The housing can be produced by, for example, molding a resin. The resin material used to form the housing is preferably a flame-retarded resin classified as V-0 or higher in UL-94 standard. "A guide to the Safe Use of Lithium Ion Secondary Batteries in Notebook-type Personal Computers" (Japan Electronics Information Industries Association and Battery Association of Japan) recommends the use of such flame-retarded resins as the resin materials for housings. The constituent material of the housing is preferably a polymer material which is rendered flame-retardant. The polymer material is preferably one of polycarbonate (PC), polypropylene (PP), and polyethylene terephthalate (PET) which is rendered flame-retardant.

The housing comprises, for example, a case body with an opening and a cover plate covering the opening of the case body. The case body and the cover are joined by, for example, adhesive or thermal welding. The adhesive is, for example, Super X available from Cemedine Co., Ltd. In terms of workability, the thermal welding is preferably ultrasonic welding. In order for the cover to be easily attached to the case body, it is preferable to provide the case body with a recess to engage with the edge of the cover.

Step (B) is described below.

The composition for forming a heat insulating layer can be prepared by, for example, adding a solvent or dispersion medium to an alkali metal silicate. If necessary, at least one of a foam promoter and a structural material may be added to the heat-insulating-layer forming composition. The solvent or dispersion medium can be, for example, water or an organic solvent.

In terms of workability, the heat-insulating-layer forming composition is preferably water glass (an aqueous solution of sodium silicate). The water glass is, for example, sodium silicate Nos. 1 to 3 according to JIS (JIS K 1408).

Step (C) is described below.

For example, the heat-insulating-layer forming composition is applied onto the side face of each battery to form a coating, and the coating is dried to remove the solvent or dispersion medium contained in the coating, in order to form a heat insulating layer. For example, when water glass is used as the heat-insulating-layer forming composition, it is possible to form a heat insulating layer comprising solid sodium silicate containing water of crystallization.

The heat-insulating-layer forming composition can be applied by a known coating method such as immersion coating, roller coating, spraying coating, or doctor blade coating.

Step (D) is described below.

For example, when the housing prepared in step (A) comprises a case body and a cover, the batteries are placed in the housing by inserting the batteries therein from the opening of the case body and attaching the cover to the case body with adhesive or thermal welding.

In this embodiment, two batteries are placed in the housing 2, and a heat insulating layer is formed on each of the two batteries. However, even when a heat insulating layer is formed on only one of the batteries, the heat insulation effect can be obtained.

Also, in a battery pack containing three or more batteries, a heat insulating layer may be formed on all the batteries. Alternatively, a battery with a heat insulating layer and a battery without it may be alternately arranged. In order to prevent the conduction of heat to adjacent batteries more reliably, it is preferable to form a heat insulating layer on all the batteries.

Embodiment 2

Figure 3:
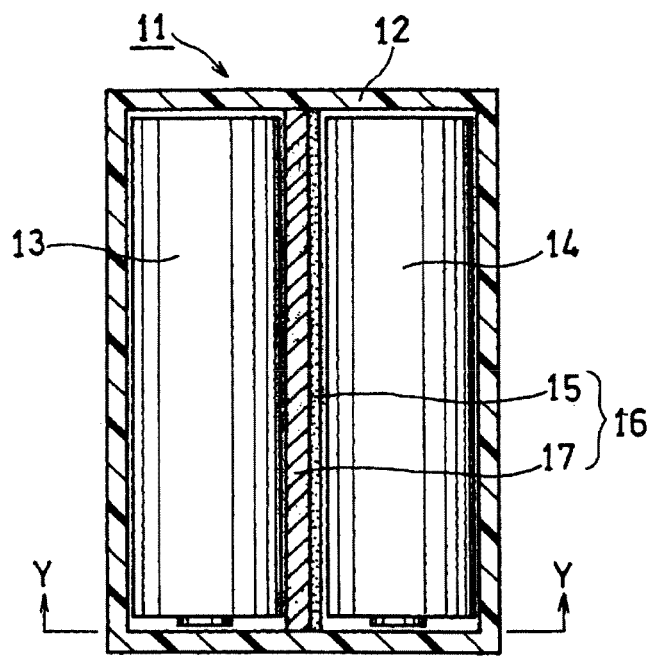
FIG. 3 is a longitudinal sectional view of a battery pack according to Embodiment 2 of the invention.
Figure 4:
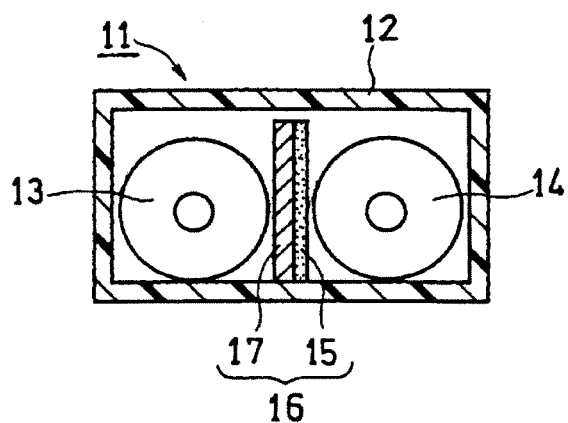
FIG. 4 is a sectional view taken along the line Y-Y of FIG. 3.

As illustrated in FIG. 3 and FIG. 4, a battery pack 11 of this embodiment comprises batteries 13 and 14, which are cylindrical secondary batteries, a prismatic resin housing 12 containing the batteries 13 and 14, and a partition plate 16 separating the battery 13 from the battery 14. The partition plate 16 comprises a support plate 17 and a heat insulating layer 15 formed on one face of the support plate 17.

Preferably, the support plate 17 is made of a material having good heat conductivity (heat diffusibility) and being capable of retaining a predetermined shape. The support plate 17 is more preferably a metal foil. Even when heat is concentrated in a part of the partition plate 16, the metal foil allows the heat to be distributed over the whole heat insulating layer 15. Therefore, the whole heat insulating layer 15 can provide efficient heat insulation. The metal foil can be a stainless steel foil, an aluminum foil, a copper foil, or a titanium foil, and among these, stainless steel is preferable. In terms of the strength of the partition plate and the reduction of size and weight of the battery pack, the thickness of the metal foil is preferably 10 to 50 µm.

In the case of using a relatively high capacity battery such as a non-aqueous electrolyte secondary battery including an alloyable negative electrode active material, the temperature of the battery becomes very high in the event of abnormal heat generation. When such a battery is used, the support plate 17 is preferably made of a material having a high melting point, such as stainless steel or titanium.

The heat insulating layer 15 can be composed of the same material as the heat insulating layers 5 and 6 of Embodiment 1. In terms of the space inside the housing 12 and the heat insulation of the heat insulating layer 15, the expansion rate of the heat insulating layer 15 in the thickness direction is preferably 30 to 600%, and more preferably 200 to 400%. In terms of the reduction of size and weight of the battery pack and the heat insulation effect, the thickness of the heat insulating layer 15 (the thickness before the foam material foams) is preferably 0.1 to 3 mm, and more preferably 1 mm or less. Even when the thickness of the heat insulating layer 15 is as thin as 1 mm or less, the support plate 17 allows the heat insulating layer to have morphological stability.

In terms of the balance between the heat conductivity of the support plate and the heat insulation of the heat insulating layer in the thickness direction of the partition plate 16, the ratio A/B of the thickness A of the support plate 17 to the thickness B of the heat insulating layer 15 (the thickness before the foam material foams) is preferably 0.05 to 1, and more preferably 0.05 to 0.5.

The method for producing the battery pack 11 of this embodiment includes, for example, the steps of;

(A) and (B) of Embodiment 1;

(C) applying the composition prepared in step (B) for forming a heat insulating layer onto one face of the support plate 17 to form a layer with a uniform thickness and drying it to form the heat insulating layer 15, thereby producing the partition plate 16; and (D) placing the batteries 13 and 14 and the partition plate 16 in the housing 12 in such a manner that the partition plate 16 is interposed between the battery 13 and the battery 14.

In step (C), for example, the heat-insulating-layer forming composition is applied onto one surface of the support plate 17 to form a coating, and the coating is dried to remove the solvent or dispersion medium in the coating, so that the heat insulating layer 15 is formed on one face of the support plate 17.

In step (D), for example, when the housing 2 prepared in step (A) comprises a case body and a cover, the battery 13, the battery 14, and the partition plate 16 are placed in the housing 2 by inserting the battery 13 and the battery 14 from the opening of the case body, inserting the partition plate 16 between the battery 13 and the battery 14, and attaching the cover to the case body with adhesive or thermal welding.

Also, when a groove for receiving an end of the partition plate is formed in a predetermined part of the inner face of the case body in step (A), the end of the partition plate may be fitted to the groove in advance to place the partition plate in the predetermined position of the case body before the step (D) of placing the batteries in the case body.

Further, in step (A), the case body and the partition plate may be integrated by insert molding. For example, a support plate having a base portion and an upstanding portion extending perpendicularly from one end of the base portion is prepared, and a heat insulating layer is formed on one face of the upstanding portion to produce a partition plate. Using the partition plate as a part to be inserted, an insert molding is performed so that the base portion of the partition plate is embedded in the bottom of the case body when a resin is molded into the case body.

According to this embodiment, even when one of the batteries 13 and 14 generates abnormal heat, the heat heats up the heat insulating layer 15 directly or via the support plate 17 having high heat conductivity, thereby allowing the foam material in the heat insulating layer 15 to foam. As a result, a large number of gas bubbles are produced inside the heat insulating layer 15, and its thickness increases, thereby thermally insulating the battery 13 from the battery 14.

In terms of the heat insulation effect, the width of the partition plate 16 (in a plane perpendicular to the axial direction of the batteries, the length of the heat insulating layer 15 in the plane direction) is preferably equal to or more than the diameter of the batteries 13 and 14 contained in the housing (equal to or more than the height of the batteries from the surface (the inner bottom face of the housing) on which the batteries are placed), as illustrated in FIG. 4.

When prismatic batteries are contained in the housing instead of the cylindrical batteries, the width of the partition plate 16 (in a plane perpendicular to the axial direction of the batteries, the length of the heat insulating layer 15 in the plane direction) is preferably equal to or more than the height of the prismatic batteries from the surface (the inner bottom face of the housing) on which the batteries are placed.

In this embodiment, the heat insulating layer is disposed on one face of the support plate, but the heat insulating layer may be disposed on both faces of the support plate. In this case, the heat diffusion effect of the support plate becomes more evident.

Embodiment 3

Figure 5:
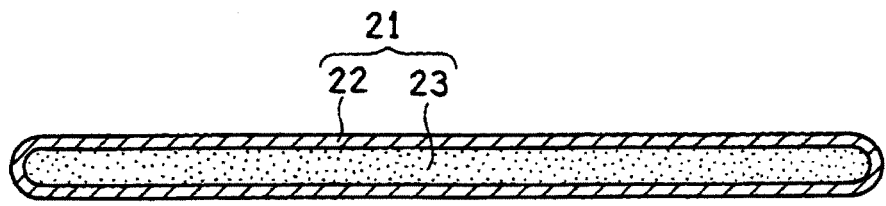
FIG. 5 is a sectional view of a partition plate in the thickness direction included in a battery pack according to Embodiment 3 of the invention.

The battery pack of this embodiment has the same structure as that of Embodiment 2 except for the use of a partition plate 21, illustrated in FIG. 5, which comprises a heat insulating layer 23 and a pouch 22 containing the heat insulating layer 23, instead of the partition plate 16 of Embodiment 2.

The pouch 22 is made of a deformable material so that the heat insulating layer 23 is capable of expanding. The heat insulating layer 23 is contained in the pouch 22 so that it is capable of expanding. Since the pouch 22 is gas-tightly sealed, the heat insulating layer 23 is securely held inside the pouch 22.

In a section of the partition plate 21 in the thickness direction, the circumferential length of the portion of the pouch 22 covering each end face of the heat insulating layer 23 is preferably made longer than the thickness of the heat insulating layer 23 (the thickness before the foam material foams), in order for the heat insulating layer 23 to easily expand in the thickness direction. In a section of the partition plate 21 in the thickness direction, the circumferential length of the portion of the pouch 22 covering each end face of the heat insulating layer 23 is preferably about 1.3 to 7 times longer than the thickness of the heat insulating layer 23 (the thickness before the foam material foams), and more preferably about 3 to 5 times. In terms of the morphological stability of the heat insulating layer 23 in the pouch 22 and the internal volume of the pouch 22, the expansion rate of the heat insulating layer 23 in the thickness direction is preferably 30 to 600%, and more preferably 200 to 400%.

In terms of the strength of the pouch and the reduction of size and weight of the battery pack, the pouch 22 preferably comprises an aluminum laminate film. In terms of the strength of the aluminum laminate film and the reduction of size and weight of the battery pack, the thickness of the aluminum laminate film is preferably 80 to 150 μm. The aluminum laminate film comprises an aluminum layer and resin layers formed on both faces of the aluminum layer. In terms of the strength and gas tightness, the thickness of the resin layer (the thickness of the resin layer on one face) is preferably 20 to 50 μm.

The aluminum laminate film includes the aluminum layer with good heat conductivity. Thus, even when heat is concentrated on a part of the partition plate, the aluminum layer allows the heat to be diffused over the whole heat insulating layer. Thus, the heat insulating layer does not partially have poor heat insulation, and the heat insulating layer can provide efficient heat insulation. In terms of the heat conductivity of the aluminum layer and the reduction of size and weight of the battery pack, the aluminum layer is preferably an aluminum foil with a thickness of 20 to 50 μm.

Preferably, the resin layer formed on one face of the aluminum layer acts as a surface protective layer, while the resin layer formed on the other face of the aluminum layer acts as an adhesive layer (thermal welding layer). The adhesive layer is intended to bond films (adhesive layers). The material of the adhesive layer is preferably polypropylene (PP), polyvinyl chloride (PVC), or polyethylene (PE). The thickness of the adhesive layer is preferably 20 to 50 μm.

The material of the surface protective layer is preferably a polyamide (PA) or polyethylene terephthalate (PET). Examples of polyamides include 6-nylon, 6,6-nylon, 6,10-nylon, and 6,12-nylon. Among these, 6,10-nylon and 6,12-nylon are preferable since they have relatively high melting points and are highly heat-resistant. The thickness of the surface protective layer is preferably 10 to 50 μm.

The heat insulating layer 23 may be composed of the same material as the heat insulating layers 5 and 6 of Embodiment 1. In terms of the heat insulation effect and the reduction of size and weight of the battery pack, the thickness of the heat insulating layer 23 (the thickness before the foam material foams) is preferably 0.1 to 3 mm, and more preferably 1 mm or less. Even when the heat insulating layer 23 is as thin as 1 mm or less, the pouch 22 allows the heat insulating layer 23 to have morphological stability.

In terms of the balance between the heat conductivity of the aluminum laminate film and the heat insulation of the heat insulating layer in the thickness direction of the partition plate 21, the ratio A/B of the thickness A of the pouch 22 to the thickness B of the heat insulating layer 23 (the thickness before the foam material foams) is preferably 0.05 to 1.

By disposing the partition plate 21 between the batteries contained in the housing, the conduction of heat from a battery generating abnormal heat to an adjacent normal battery can be suppressed in the same manner as in Embodiment 2.

The method for producing a battery pack in this embodiment includes, for example, the steps of:

(A) and (B) of Embodiment 1;

(C) forming a heat insulating layer by using the composition prepared in step (B) for forming a heat insulating layer and placing the heat insulating layer 23 in the pouch 22 to produce the partition plate 21; and (D) placing the batteries 13 and 14 and the partition plate 21 in the housing 12 in such a manner that the partition plate 21 is interposed between the battery 13 and the battery 14.

In step (C), for example, the heat-insulating-layer forming composition prepared in step (B) is filled into a pouch from the opening thereof so as to form a layer with a uniform thickness, thereby forming the heat insulating layer 23. Thereafter, the opening is closed to produce the partition plate 21. In step (C), the heat-insulating-layer forming composition may be dried, but does not need to be dried since the heat-insulating-layer forming composition is gas-tightly sealed in the pouch. It is also possible to separately form a heat insulating layer that is shaped like a plate and thereafter inserting it into a pouch.

Also, in step (C), two aluminum laminate films of the same shape (hereinafter referred to as simply "films") may be used to produce a partition plate, as follows.

Specifically, the heat-insulating-layer forming composition is applied onto a film and dried to form a heat insulating layer. At this time, the heat insulating layer is not formed on the peripheral portion of the film to expose the film. That is, the film is exposed in the shape of a frame.

Another film is placed over the heat insulating layer, and the peripheral portions of the two films are bonded with adhesive or thermal welding. In this manner, a pouch containing the heat insulating layer is produced.

At this time, a predetermined outer peripheral part of the frame-shaped exposed portion of each film is used as the portion to be bonded. An area not to be bonded is provided between the portion of the film for the heat insulating layer and the portion to be bonded, so the heat insulating layer is capable of expanding in the pouch. In the case of thermal welding, the resin layer to be bonded is preferably used as the above-mentioned adhesive layer. The heat insulating layer needs to be contained in the pouch, and does not need to adhere to the inner face of the pouch. The heat insulating layer can be stably held inside the pouch both before and after the expansion of the heat insulating layer.

In step (D), the battery 13, the battery 14, and the partition plate 21 can be placed in the housing 2 in the same manner as in Embodiment 2.

EXAMPLES

The heat insulation effect of the battery pack of the invention was evaluated using metal cylinders instead of batteries.

Example 1

The battery pack of Embodiment 1 was produced in the following manner.

Instead of the secondary batteries 3 and 4 used in Embodiment 1, two cylinders made of SUS 304 with a length of 65 mm and an outer diameter of 18 mm were prepared. A composition for forming a heat insulating layer was evenly applied onto the side face of each cylinder, and left for a whole day and night for natural drying to form a heat insulating layer (thickness 1 mm) comprising sodium silicate containing water of crystallization. In this manner, the side face of each cylinder was covered with the heat insulating layer. The heat-insulating-layer forming composition was an aqueous solution of sodium silicate prepared by mixing 80 parts by mass of silicate of soda (trade name: silicate of soda, No. 3, available from Osaka Keisou Co., Ltd.) and 20 parts by mass of water. The $Na_2O:SiO_2$ molar ratio was 1:3.

The two cylinders covered with the heat insulating layer at the side face were placed in a case body made of polycarbonate (PC) whose internal space had a length of 67 mm, a width of 41 mm, a depth of 20 mm, and a thickness of 1 mm.

Specifically, a housing comprising a prismatic case body with a bottom and a quadrangular cover plate was prepared. The cylinders were placed in the case body from the opening thereof, and the cover plate was attached to the case body. In this manner, the two cylinders were placed in the housing. It should be noted that for an evaluation test described below, a battery pack was produced without joining the case body and the cover plate.

Example 2

The battery pack of Embodiment 2 was produced in the following manner.

A composition for forming a heat insulating layer was evenly applied onto one face of a stainless steel foil with a length of 65 mm, a width of 20 mm, and a thickness of 0.03 mm, and left for a whole day and night for natural drying to form a heat insulating layer (thickness 1 mm) comprising sodium silicate containing water of crystallization. In this manner, a partition plate with a length of 65 mm, a width of 20 mm, and a thickness of 1 mm was prepared. The heat-insulating-layer forming composition was the same as that used in Example 1.

Instead of the secondary batteries 13 and 14 used in Embodiment 2, cylinders made of SUS 304 with a length of 65 mm and an outer diameter of 18 mm were prepared.

The partition plate and the two cylinders were placed in a housing which is the same as that used in Example 1.

Specifically, a housing comprising a prismatic case body with a bottom and a quadrangular cover plate was prepared. The two cylinders were placed in the case body, and the partition plate was inserted between the two cylinders. Thereafter, the cover plate was attached to the case body. In this manner, the partition plate and the two cylinders were placed in the housing. It should be noted that for an evaluation test described below, a battery pack was produced without joining the case body and the cover plate.

Example 3

A battery pack was produced in the same manner as in Example 1, except that Accera coat F (composed mainly of silicate of soda and containing a structural material and the like) available from Access Co., Ltd. was used as the composition for forming a heat insulating layer. The $Na_2O:SiO_2$ molar ratio was set to 1:3.2.

Example 4

A battery pack was produced in the same manner as in Example 2, except that Accera coat F (composed mainly of silicate of soda and containing a structural material and the like) available from Access Co., Ltd. was used as the composition for forming a heat insulating layer.

Comparative Example 1

A battery pack was produced in the same manner as in Example 1, except that the side faces of two cylinders were not covered with a heat insulating layer and that a PC plate with a length of 65 mm, a width of 20 mm, and a thickness of 1 mm was disposed between the two cylinders.

Example 5

The battery pack of Embodiment 3 was produced in the following manner.

A composition for forming a heat insulating layer was evenly applied onto one face of an aluminum laminate film (length 73 mm, width 28 mm, thickness 0.1 mm) (hereinafter referred to as simply a "film"), and left for a whole day and night for natural drying to form a heat insulating layer (length 65 mm, width 20 mm, thickness 1 mm) comprising sodium silicate containing water of crystallization.

The heat-insulating-layer forming composition was the same as that used in Example 1. The film was a laminate of an aluminum layer (thickness 40 μm), a PET layer (surface protective layer) (thickness 30 μm) formed on one face of the aluminum layer, and a PP layer (adhesive layer) (thickness 30 μm) formed on the other face of the aluminum layer. The heat insulating layer was formed on a surface of the adhesive layer of the film. At this time, the heat insulating layer was not formed on the peripheral portion of the film so that the film was exposed in the shape of a frame. The width of the exposed portion was set to 4 mm.

Another film, which was the same as the above-mentioned film, was placed over the heat insulating layer, and the two films were laminated so that the adhesive layers faced the heat insulating layer. The exposed portions (the adhesive layers) of the two films were thermally welded to produce the partition plate 21 comprising the heat insulating layer and the films forming a pouch containing the heat insulating layer.

At this time, a 2-mm-wide outer peripheral part of the frame-shaped exposed portion of each film was used as the portion to be thermally welded. A portion (2 mm wide) not to be thermally welded was provided between the portion of the film for the heat insulating layer and the portion to be thermally welded, so the heat insulating layer was capable of expanding in the pouch.

A battery pack was produced in the same manner as in Example 2, except for the use of the partition plate prepared in the above manner instead of the partition plate of Example 2.

Example 6

A battery pack was produced in the same manner as in Example 5, except that Accera coat F (composed mainly of silicate of soda and containing a structural material and the like) available from Access Co., Ltd. was used as the composition for forming a heat insulating layer.

[Evaluation]

Examples 1 to 6 and Comparative Example 1 were evaluated as follows. A ceramic heater (MS-M5 available from SAKAGUCHI E.H. VOC CORP.) was prepared. The cover was detached from the housing, and a plate-shaped heat generator of the ceramic heater was brought into contact with one end face of one of the cylinders, and a pair of lead wires extending from the heat generator was connected to a power source having an inter-terminal voltage of 6 V. The temperature of the heater was set to 700° C. After ten minutes from the time when the temperature of the heater reached 700° C., the temperature of the other cylinder was measured with a thermocouple.

Also, using a digital vernier scale, the thickness of the heat insulating layer before expansion due to heating by the heater and the thickness of the heat insulating layer after expansion due to heating by the heater were measured. The expansion rate was calculated from the following formula.

Expansion rate (%)=(thickness of heat insulating layer after expansion−thickness of heat insulating layer before expansion)/(thickness of heat insulating layer before expansion)×100

Table 1 shows the results.

TABLE 1

| Evaluation sample | | Temperature of cylinder (° C.) | Expansion rate of heat insulating layer (%) |
|---|---|---|---|
| Invention | Example 1 | 91 | 350 |
| | Example 2 | 105 | 280 |
| | Example 3 | 94 | 360 |
| | Example 4 | 101 | 270 |
| | Example 5 | 110 | 250 |
| | Example 6 | 108 | 240 |
| Comparative Example 1 | | 321 | 0 |

As is clear from the results, Examples 1 to 6 of the invention produced a very good heat insulation effect, compared with the Comparative Example 1, and the conduction of heat between the adjacent secondary batteries could be effectively suppressed. In Examples 1 to 6, the heat insulating layer expanded due to the production of gas bubbles, thereby resulting in the good heat insulation effect.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

INDUSTRIAL APPLICABILITY

The battery pack according to the invention is useful as the battery pack for personal computers, cellular phones, etc., since the conduction of abnormal heat generated by one of adjacent secondary batteries to the other secondary battery can be effectively suppressed. It is also applicable to packages for large, stationary batteries, electric vehicle batteries, etc.

The invention claimed is:

1. A battery pack comprising:
a plurality of secondary batteries;
a housing for containing the secondary batteries; and
at least one heat insulating layer for separating the secondary batteries from one another,
wherein the at least one heat insulating layer includes a foam material which foams at a first predetermined temperature of 110° C. or more and less than 200° C., and
the thickness of the heat insulating layer increases when the foam material foams,
at least one partition is disposed so as to separate the secondary batteries from one another, and
the at least one partition includes a sealed pouch, and the heat insulating layer is contained in the sealed pouch.

2. The battery pack in accordance with claim 1, wherein the thickness of the heat insulating layers before the foam material foams is 0.1 to 3 mm.

3. The battery pack in accordance with claim 1,
wherein the secondary batteries are cylindrical and aligned in a lateral direction so that the axes of the secondary batteries are parallel to one another, and
the partition has a width that is equal to or greater than the diameter of the secondary batteries.

4. A battery pack comprising:
a plurality of secondary batteries;
a housing for containing the secondary batteries; and
at least one heat insulating layer for separating the secondary batteries from one another,
wherein the at least one heat insulating layer includes a foam material which foams at a first predetermined temperature of 110° C. or more and less than 200° C.,
the thickness of the heat insulating layer increases when the foam material foams, and
the foam material comprises a silicate of an alkali metal containing water of crystallization.

5. The battery pack in accordance with claim 4, wherein the alkali metal is at least one selected from the group consisting of sodium, potassium, and lithium.

6. A battery pack comprising:
a plurality of secondary batteries;
a housing for containing the secondary batteries; and
at least one heat insulating layer for separating the secondary batteries from one another,
wherein the at least one heat insulating layer includes a foam material which foams at a first predetermined temperature of 110° C. or more and less than 200° C.,
the thickness of the heat insulating layer increases when the foam material foams, and
the heat insulating layer further includes a foam promoter which foams at a second predetermined temperature of 200° C. or more; and a structural material comprising inorganic particles which do not foam at the second predetermined temperature.

7. The battery pack in accordance with claim 6, wherein the foam promoter is at least one selected from the group consisting of aluminum hydroxide, calcium hydroxide, magnesium hydroxide, alum, sodium sulfate, calcium carbonate, magnesium carbonate, and barium carbonate.

8. The battery pack in accordance with claim 6, wherein the structural material is at least one selected from the group consisting of aluminum silicate, sodium silicofluoride, bentonite, monmorillonite, kaolinite, mullite, diatomaceous earth, alumina, silica, mica, titanium oxide, vermiculite, pearlite, Maglite, sepiolite, talc, calcium silicate, magnesium silicate, calcium sulfate, and cement.

9. The battery pack in accordance with claim 4, wherein the at least one heat insulating layer comprises heat insulating layers each of which is disposed on a surface of each of the secondary batteries.

10. The battery pack in accordance with claim 6, wherein the at least one heat insulating layer comprises heat insulating layers each of which is disposed on a surface of each of the secondary batteries.

11. The battery pack in accordance with claim 4, wherein the at least one heat insulating layer is supported on at least one partition disposed so as to separate the secondary batteries from one another, and
the partition includes a metal foil, and the heat insulating layer is supported on one face of the metal foil.

12. The battery pack in accordance with claim 6 wherein the at least one heat insulating layer is supported on at least one partition disposed so as to separate the secondary batteries from one another, and
the partition includes a metal foil, and the heat insulating layer is supported on one face of the metal foil.

13. The battery pack in accordance with claim 1, wherein the sealed pouch is made of a deformable material.

* * * * *